(12) United States Patent
Cina

(10) Patent No.: US 7,239,234 B2
(45) Date of Patent: Jul. 3, 2007

(54) ALERT MANAGEMENT

(75) Inventor: Miroslav Cina, Ratingen (DE)

(73) Assignee: SAP Aktiengesellschaft, Walldorf (DE)

( * ) Notice: Subject to any disclaimer, the term of this patent is extended or adjusted under 35 U.S.C. 154(b) by 203 days.

(21) Appl. No.: 10/897,159

(22) Filed: Jul. 21, 2004

(65) Prior Publication Data

US 2006/0017546 A1  Jan. 26, 2006

(51) Int. Cl.
*G08B 23/00* (2006.01)

(52) U.S. Cl. .................. 340/501; 340/506; 340/525; 702/184; 702/188

(58) Field of Classification Search ............... 340/501, 340/506, 525; 702/184, 188, 1
See application file for complete search history.

(56) References Cited

U.S. PATENT DOCUMENTS 6,750,766 B1 * 6/2004 Heitner et al. ............. 340/525
6,909,992 B2 * 6/2005 Ashley ...................... 702/184

OTHER PUBLICATIONS

"Scheduling for Counter-Based Service Intervals," (SAP Library—Planned Services), http://help.sap.com/ , 2 pages (2004).
"Counters," (SAP Library—Case Management), http://help.sap.com/, 2 pages (2004).

* cited by examiner

*Primary Examiner*—Daryl C Pope
(74) *Attorney, Agent, or Firm*—Fish & Richardson P.C.

(57) ABSTRACT

Methods and apparatus, including computer program products, implementing techniques for alert management. The techniques include predicting an alert date for an alert that is associated with a counter, some time after the prediction, receiving an updated value for the counter, and in response to receiving the updated value and without user intervention, adjusting the predicted alert date according to the updated value. The alert date is the date when the counter is predicted to reach a target value.

18 Claims, 3 Drawing Sheets

ALERT MANAGEMENT

BACKGROUND

The present invention relates to data processing by digital computer, and more particularly to alert management.

An alert is a computer programming construct that defines a set of actions to be performed upon the occurrence of a triggering condition.

SUMMARY OF THE INVENTION

The present invention provides methods and apparatus, including computer program products, that implement techniques for alert management.

In general, in one aspect, the techniques include predicting an alert date for an alert that is associated with a counter, some time after the prediction, receiving an updated value for the counter, and in response to receiving the updated value and without user intervention, adjusting the predicted alert date according to the updated value. The alert date is the date when the counter is predicted to reach a target value.

Implementations of the invention can include one or more of the following features.

The techniques further include raising the alert on the alert date. Raising the alert includes triggering execution of one or more actions defined for the alert. Raising the alert occurs prior to adjusting the alert date and includes triggering execution of one or more alert actions; and adjusting the predicted alert date includes rescheduling the predicted alert date to a later date and canceling the one or more alert actions that were already executed.

Adjusting the predicted alert date includes determining based on the updated value for the counter that the predicted alert date is too soon and rescheduling the predicted alert date to a later date. Adjusting the predicted alert date includes determining based on the updated value for the counter that the predicted alert date is too late and rescheduling the predicted alert date to an earlier date.

In general, in another aspect, the techniques include creating an alert master record for each of a plurality of alerts, creating a list that contains a list entry for each of the plurality of alerts, linking each list entry to the alert master record for the alert, displaying the list; and receiving user input selecting an alert from the list and in response, navigating from the list to the alert master record for the selected alert.

Implementations of the invention can include one or more of the following features.

Each alert in the plurality of alerts is associated with a counter.

The techniques further include predicting an alert date for each alert, some time after the prediction, receiving an updated value for the counter; and in response to receiving the updated value and without user intervention, adjusting the predicted alert date according to the updated value. The alert date is the date when the counter is predicted to reach a target value.

The techniques further include sorting the list according to the alert dates for the alerts.

The invention can be implemented to realize one or more of the following advantages.

A large number of alerts are managed efficiently. When new counter readings are received for counter-based alerts, the counter-based alerts are adjusted automatically without user intervention.

It is easy for users to access information about each of the alerts. Users can view all the alerts at once in a single listing and from this single listing navigate directly to a more detailed record of an alert.

One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
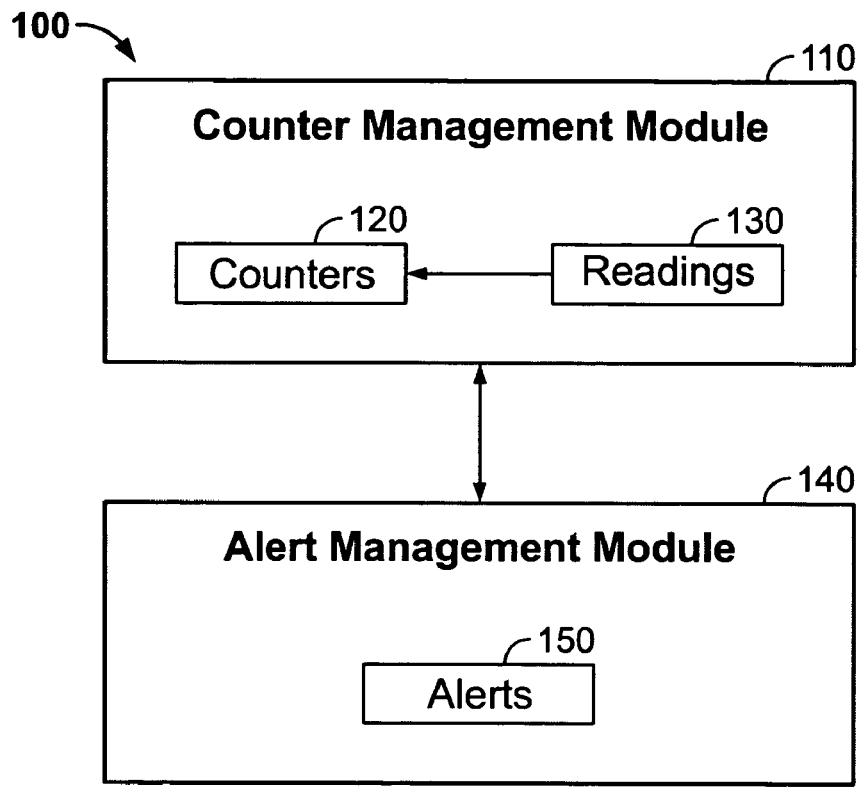
FIG. 1 is a block diagram of a system in accordance with the invention.

FIG. 1 shows a system 100 in accordance with the invention. This system can be implemented as a stand-alone system, or alternatively, can be implemented as a component of a larger system, for example, of a business data processing system. One example of a business data processing system is a customer relationship management (CRM) system, for example, the mySAP CRM system, available from SAP AG of Walldorf (Baden), Germany.

As shown in FIG. 1, the system 100 includes a counter management module 110 for defining and maintaining a large set of counters 120. A counter 120 is a programming construct that represents a measurable characteristic of a physical device, for example, the temperature level of a computer, the odometer level of a car, the usage level of a copy machine, or any other parameter that can be measured. Each counter has a value that the counter management module 110 continually updates based on readings 130 taken from the physical device being represented.

The system 100 further includes an alert management module 140 for scheduling and raising alerts 150. In the implementation that will be described, an alert 150 is a system object that is scheduled to perform a set of actions (alert actions) on a given date, referred to as the alert date. An alert 150 can have more than one alert date. For example, the alert can be scheduled to perform some of the alert actions on a first alert date and other alert actions on a second alert date. In the implementation that will be described, however, an alert 150 has only a single alert date.

Scheduling Alerts

The alert management module 140 schedules an alert by defining the alert date and the alert actions for the alert. The alert date can be defined according to a number of different criteria, including time factors and counter values. An example of a time-based alert is an alert that terminates a warranty contract for a car after two years of use. An example of a counter-based alert is an alert that sends a 10,000-mile service invitation to the car's owner, once the car has been driven 10,000 miles.

Each counter-based alert is associated with a particular counter. For example, in the service invitation example, the alert would be associated with the counter that represents the odometer level of the car.

Multiple alerts can be associated with a single counter. For example, in the service invitation example, the alert management module 140 may define multiple alerts, each corresponding to a different service (e.g., one alert for the 10,000 mile service, another for oil change, and so on).

In some cases, the alert can be both time-based and counter-based. For example, in the service invitation example, the alert can be set to send out the service invitation after 10,000 miles or after one year.

Raising Alerts

The alert management module 140 raises an alert by performing the alert actions defined for the alert.

The alert can be raised on the alert date. In some cases, however, it may be desirable to raise the alert in advance of the alert date. For example, in the service invitation example, it may be desirable to send out the service invitation before the 10,000-mile mark is reached. In one implementation, the alert management module 140 schedules an alert to be raised in advance of the alert date by a predetermined time interval, which will be referred to as the alert buffer.

Predicting Alert Dates

In one implementation, the alert date represents a prediction of when the alert criteria will be met. For example, in the service invitation example, the alert management module 140 can predict when the counter value will reach 10,000 miles and use this predicted date as the alert date for the alert. The alert management module 140 can then automatically adjust the predicted alert date as the counter value is updated based on new odometer readings.

For example, in the service invitation example, the alert management module 140 may initially predict that the 10,000-mile mark will be reached after six months. The alert management module 140 makes this prediction based on an estimated usage rate of 20,000 miles per year. However, after five months, the alert management module 140 may receive an update indicating that the counter value is 5,000 miles. Based on the updated counter value and the actual usage rate so far, the alert management module 140 predicts that the 10,000-mile mark may not be reached for another five months. In response to this update, the alert management module 140 adjusts the prediction from the six-month date to the ten-month date. This adjustment is performed automatically, that is, without user intervention.

Data Model

Figure 2:
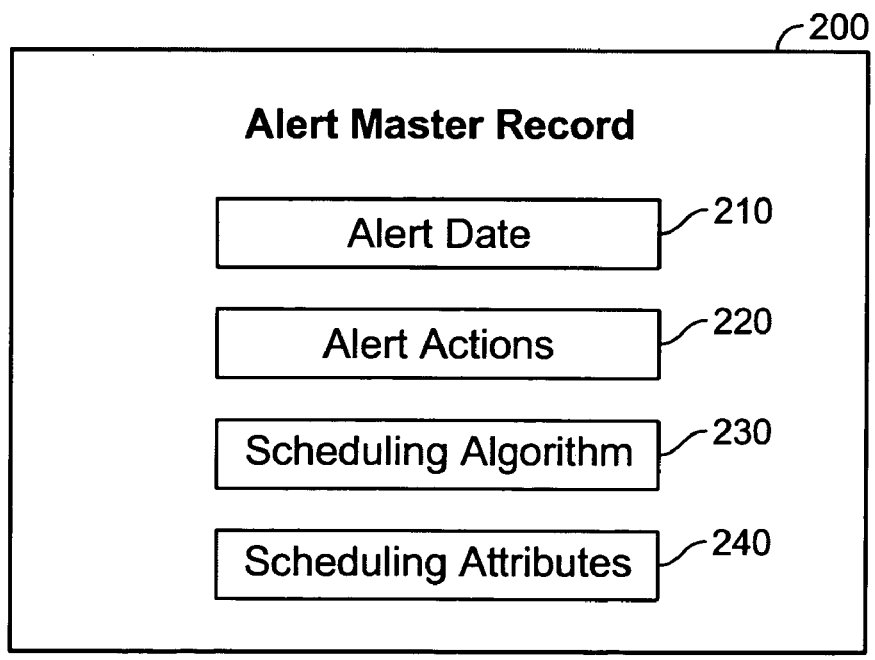
FIG. 2 shows an example of an alert master record.

In one implementation, for each alert, the alert management module 140 creates an alert master record that stores the definition of the alert. As shown in FIG. 2, the alert master record 200 stores the alert date 210 and the alert actions 220.

In addition, the alert master record 200 can store a reference 230 to a particular algorithm to be used for scheduling the alert date. In one implementation, the alert management module 140 receives user input specifying the particular algorithm to be used and, if no such user input is received, the alert management module 140 uses a default algorithm. The alert master record 200 can also store any attributes 240 that are required by the scheduling algorithm.

For example, one scheduling algorithm uses the following attributes 240:

(1) a start date for operation of a car (e.g., Jan. 1, 2004)
(2) an estimated usage rate (e.g., 20,000 miles per year)
(3) a service interval (e.g., every 10,000 miles)
(4) an alert buffer (e.g., two weeks)

Using the example values shown above in parentheses, the scheduling algorithm schedules an alert date of May 15, 2004 (two weeks prior to Jun. 1, 2004).

Figure 3:
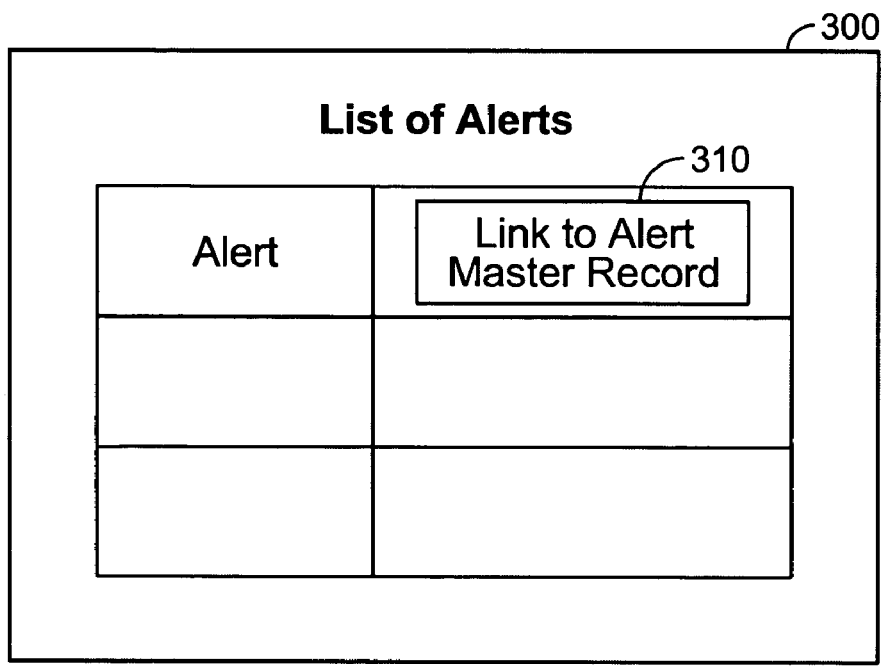
FIG. 3 shows an example of a list of alerts.

In one implementation, the alert management module 140 displays all the alerts 150 in a single list 300, as shown in FIG. 3. The list can display information about each alert, for example, the alert date for each alert. The list can be sorted according to a particular category of information, for example, according to the alert date. The list 300 can also be linked 310 to the alert master records for each of the alerts.

This list 300 makes it easy to for users to manage a large number of alerts. Users do not need to navigate to each particular counter in order to view the alerts for that counter. Instead, users can view all the alerts at once and navigate quickly to the alert master record for any alert.

Process Model

Figure 4:
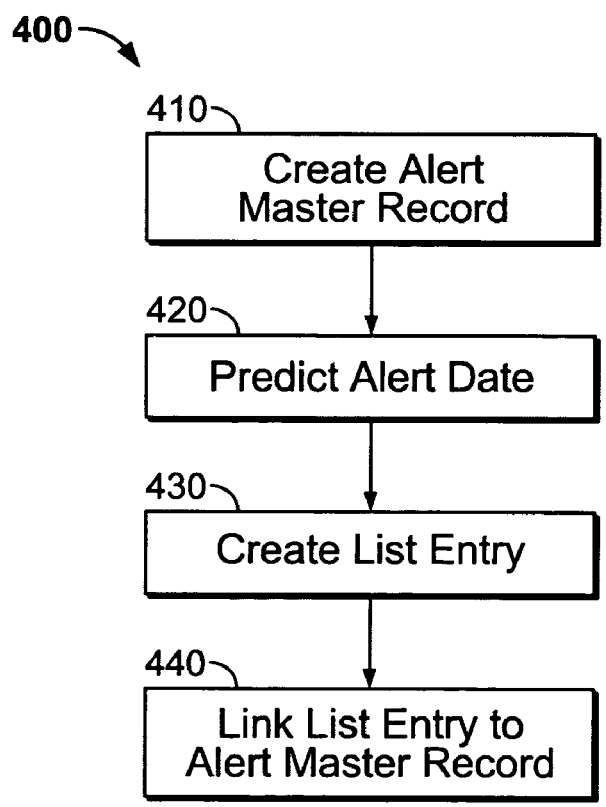
FIG. 4 is a flow diagram of a method in accordance with the invention.
Figure 5:
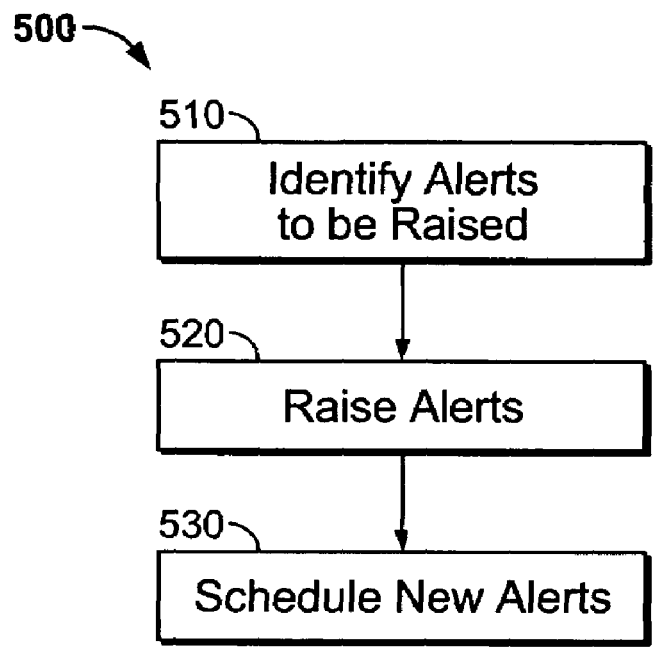
FIG. 5 is a flow diagram of another method in accordance with the invention.
Figure 6:
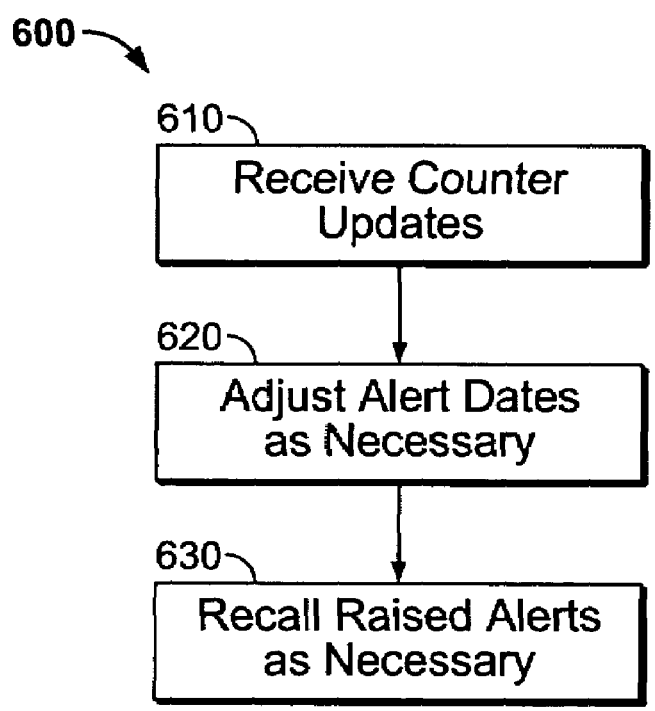
FIG. 6 is a flow diagram of another method in accordance with the invention.

In one implementation, illustrated in FIGS. 4-6, the alert management module 140 includes three separate processes 400, 500, 600 running in parallel.

The first process, an alert definition process 400 shown in FIG. 4, is responsible for defining new alerts. This process creates an alert master record for each new alert (step 410), predicts an alert date for each new alert (step 420), creates a list entry for each new alert (step 430) and links the list entry to the alert master record (step 440).

The second process, an alert raising process 500 shown in FIG. 5, is responsible for raising alerts. On a given date, this process identifies all the alerts whose alert date is the given date (step 510) and raises each of these alerts (step 520). Optionally, the alert raising process 500 can also schedule a new alert to be raised at a later date (step 530). For example, the alert raising process 500 can schedule the new alert using information in the alert master record that specifies the criteria for the next alert. For example, in the service invitation example, the alert master record can specify that the service interval be every 10,000 miles. Based on this information, the alert raising process 500 automatically schedules the next alert to be raised at 20,000 miles.

The third process, an alert adjustment process 600 shown in FIG. 6, is responsible for adjusting the predicted alert dates as the associated counters are updated. This process receives counter updates (step 610), and adjusts the alert dates as necessary based on the received counter updates (step 620).

Because the alert adjustment process 600 runs in parallel with the alert raising process 500, it is possible that the alert raising process 500 raises an alert before the alert adjustment process 600 has a chance to adjust the alert date for the alert. To account for this possibility, the alert adjustment process 600 checks to see if the alert has been raised, and if so, the alert adjustment process 600 cancels the raising of the alert (step 630).

For example, in the service invitation example described above, suppose that the alert has an alert buffer of two months. This means that even though the alert date is predicted to be the six-month date, the alert is raised at the four-month date. Suppose that at the four-month date, the alert is raised and the service invitation is mailed out. Later, at the five-month date, the alert date is adjusted as described above. In this situation, the adjustment process would also cancel the service invitation that was mailed out at the four-month date. For example, the adjustment process might send out an update notice indicating that, based on more recently received use information, the service invitation was premature.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. Other embodiments are within the scope of the following claims

What is claimed is:

1. A non-volatile memory encoded with a computer program, the computer program being operable to cause a computation to perform operations comprising:
   predicting an alert date for an alert that is associated with a counter, the counter having a value that represents a measurable characteristic of a physical device, the alert date being the date when the counter is predicted to reach a target value;
   some elapsed time after the prediction, receiving an updated value for the counter, the updated value being based on a reading of the measurable characteristic of the device; and
   in response to receiving the updated value and without user intervention, adjusting the predicted alert date according to the updated value and the elapsed time.

2. The product of claim 1, wherein the operations further comprise:
   raising the alert on the alert date.

3. The product of claim 2, wherein raising the alert comprises:
   triggering execution of one or more actions defined for the alert.

4. The product of claim 2, wherein:
   raising the alert occurs prior to adjusting the alert date and includes triggering execution of one or more alert actions; and
   adjusting the predicted alert date includes:
      rescheduling the predicted alert date to a later date and canceling the one or more alert actions that were already executed.

5. The product of claim 1, wherein adjusting the predicted alert date includes:

determining based on the updated value for the counter that the predicted alert date is too soon; and rescheduling the predicted alert date to a later date.

6. The product of claim 1, wherein adjusting the predicted alert date includes:

determining based on the updated value for the counter that the predicted alert date is too late; and rescheduling the predicted alert date to an earlier date.

7. A non-volatile memory encoded with a computer program, the computer program being operable to cause a computation to perform operations comprising:

creating an alert master record for each of a plurality of alerts;

creating a list that contains a list entry for each of the plurality of alerts;

linking each list entry to the alert master record for the alert;

displaying the list; and receiving user input selecting an alert from the list and in response, navigating from the list to the alert master record for the selected alert.

8. The product of claim 7, wherein:

each alert in the plurality of alerts is associated with a counter; and the operations further comprise:

predicting an alert date for each alert, the alert date being the date when the counter is predicted to reach a target value;

some time after the prediction, receiving an updated value for the counter; and in response to receiving the updated value and without user intervention, adjusting the predicted alert date according to the updated value.

9. The product of claim 8, wherein the operations further comprise:

sorting the list according to the alert dates for the alerts.

10. Apparatus comprising:

means for predicting an alert date for an alert that is associated with a counter, the counter having a value that represents a measurable characteristic of a physical device, the alert date being the date when the counter is predicted to reach a target value;

means for, some elapsed time after the prediction, receiving an updated value for the counter, the updated value being based on a reading of the measurable characteristic of the device; and means for, in response to receiving the updated value and without user intervention, adjusting the predicted alert date according to the updated value and the elapsed time.

11. The apparatus of claim 10, further comprising:

means for raising the alert on the alert date.

12. The apparatus of claim 11, wherein the means for raising the alert comprises:

means for triggering execution of one or more actions defined for the alert.

13. The apparatus of claim 11, wherein:

the means for raising the alert includes means for triggering execution of one or more alert actions; and the means for adjusting the predicted alert date includes means for rescheduling the predicted alert date to a later date and canceling one or more alert actions that were executed when the alert was raised.

14. The apparatus of claim 10, wherein the means for adjusting the predicted alert date includes:

means for determining based on the updated value for the counter that the predicted alert date is too soon; and means for rescheduling the predicted alert date to a later date.

15. The apparatus of claim 10, wherein the means for adjusting the predicted alert date includes:

means for determining based on the updated value for the counter that the predicted alert date is too late; and means for rescheduling the predicted alert date to an earlier date.

16. Apparatus comprising:

means for creating an alert master record for each of a plurality of alerts;

means for creating a list that contains a list entry for each of the plurality of alerts;

means for linking each list entry to the alert master record for the alert;

means for displaying the list; and means for receiving user input selecting an alert from the list and in response, navigating from the list to the alert master record for the selected alert.

17. The apparatus of claim 16, wherein each alert in the plurality of alerts is associated with a counter; and further comprising:

means for predicting an alert date for each alert, the alert date being the date when the counter is predicted to reach a target value;

means for, some time after the prediction, receiving an updated value for the counter; and means for, in response to receiving the updated value and without user intervention, adjusting the predicted alert date according to the updated value.

18. The apparatus of claim 17, further comprising:

means for sorting the list according to the alert dates for the alerts.

* * * * *